US012138900B2

United States Patent
Martell et al.

(10) Patent No.: US 12,138,900 B2
(45) Date of Patent: Nov. 12, 2024

(54) COMPOSITIONS FOR MANUFACTURING FOOTWEAR STIFFENERS

(71) Applicant: Stanbee Company, Inc., Carlstadt, NJ (US)

(72) Inventors: Dale Martell, Jersey City, NJ (US); Bruce Goldberg, Clifton, NJ (US); Leo Provencher, Pass Christian, MS (US)

(73) Assignee: Stanbee Company, Inc., Roseland, NJ (US)

(*) Notice: Subject to any disclaimer, the term of this patent is extended or adjusted under 35 U.S.C. 154(b) by 76 days.

(21) Appl. No.: 17/086,611

(22) Filed: Nov. 2, 2020

(65) Prior Publication Data

US 2021/0129482 A1 May 6, 2021

Related U.S. Application Data

(60) Provisional application No. 62/928,858, filed on Oct. 31, 2019.

(51) Int. Cl.
| | |
|---|---|
| B32B 5/20 | (2006.01) |
| A43B 23/08 | (2006.01) |
| B29C 44/24 | (2006.01) |
| B29C 44/34 | (2006.01) |
| B29C 48/00 | (2019.01) |
| B29C 48/21 | (2019.01) |
| B29K 67/00 | (2006.01) |
| B29K 75/00 | (2006.01) |
| B29K 105/00 | (2006.01) |
| B29K 105/04 | (2006.01) |
| B29L 31/50 | (2006.01) |
| B32B 7/12 | (2006.01) |
| B32B 27/06 | (2006.01) |
| B32B 27/36 | (2006.01) |
| B32B 27/40 | (2006.01) |

(52) U.S. Cl.
CPC .............. *B32B 5/20* (2013.01); *A43B 23/081* (2013.01); *A43B 23/088* (2013.01); *B29C 44/24* (2013.01); *B29C 44/3446* (2013.01); *B29C 48/0011* (2019.02); *B29C 48/21* (2019.02); *B32B 7/12* (2013.01); *B32B 27/065* (2013.01); *B32B 27/36* (2013.01); *B32B 27/40* (2013.01); *B29K 2067/003* (2013.01); *B29K 2075/00* (2013.01); *B29K 2105/0097* (2013.01); *B29K 2105/041* (2013.01); *B29K 2105/046* (2013.01); *B29K 2995/0097* (2013.01); *B29L 2031/505* (2013.01); *B32B 2266/08* (2013.01); *B32B 2266/104* (2016.11); *B32B 2307/718* (2013.01); *B32B 2307/732* (2013.01); *B32B 2437/02* (2013.01)

(58) Field of Classification Search
CPC ....... A43B 23/081; A43B 23/088; B32B 5/20; B32B 7/12; B32B 27/065; B32B 27/36; B32B 27/40; B32B 2266/08
See application file for complete search history.

(56) References Cited

U.S. PATENT DOCUMENTS

| | | |
|---|---|---|
| 3,523,103 A | 8/1970 | Zemlin |
| 3,590,411 A | 7/1971 | Zemlin |
| 3,616,170 A | 10/1971 | Closson, Jr. |
| 3,647,616 A | 3/1972 | Zemlin |
| 3,891,785 A | 6/1975 | Zemlin |
| 3,973,285 A | 8/1976 | Babson et al. |
| 4,043,058 A | 8/1977 | Hollister et al. |
| 4,795,404 A | 1/1989 | Sutton et al. |
| 4,814,037 A | 3/1989 | Arnold |
| 6,391,380 B1 | 5/2002 | Goldberg |
| 6,475,619 B2 | 11/2002 | Goldberg |
| 6,616,434 B1 | 9/2003 | Burnham et al. |
| 7,083,849 B1 | 8/2006 | Albrecht |
| 7,975,404 B2 | 7/2011 | Goldberg |
| 7,976,404 B2 | 7/2011 | Golden et al. |
| 2002/0053446 A1 | 5/2002 | Moe et al. |
| 2002/0137808 A1 | 9/2002 | Gehlsen et al. |
| 2006/0264523 A1* | 11/2006 | Lee .................. C08J 9/0071 521/99 |
| 2015/0307751 A1 | 10/2015 | Eckhardt et al. |
| 2016/0244584 A1 | 8/2016 | Keppeler |
| 2017/0183469 A1 | 6/2017 | Falken |
| 2017/0273407 A1* | 9/2017 | Goldberg .............. B32B 27/304 |
| 2019/0090581 A1 | 3/2019 | Holmes et al. |
| 2021/0078276 A1* | 3/2021 | Baghdadi ................ C08L 75/04 |

OTHER PUBLICATIONS

International Search Report dated Mar. 11, 2021.
Extended European Search Report dated Sep. 27, 2023.
1 Chinese Office Action dated Jan. 26, 2024.
Kataebo Low-Temperature TPU Double-Sided Hot Melt Adhesive Film (2002).

* cited by examiner

*Primary Examiner* — Hai Vo
(74) *Attorney, Agent, or Firm* — Gerald E. Hespos; Michael J Porco

(57) ABSTRACT

A microcellular shoe stiffener has at least one adhesive layer coextruded with and carried on a stiffener core. A liquid, such as liquid nitrogen, is introduced into the extruder for the stiffener core to produce a closed cell foam with a gaseous component. The gas reduces the weight and cost of the stiffener without significantly reducing stiffness and resiliency.

14 Claims, No Drawings

COMPOSITIONS FOR MANUFACTURING FOOTWEAR STIFFENERS

This application claims priority on U.S. Provisional Application No. 62/928,858 filed on Oct. 31, 2019, the entire disclosure of which is incorporated herein by reference.

FIELD OF THE INVENTION

The invention relates to stiffeners, such as the stiffeners used in the manufacture of shoes to retain the shape of heel and toe portions of the footwear.

BACKGROUND

Boxtoes and counters are used in the front and back of the shoe to provide shape and stiffness. There are a number of different types of stiffeners used for boxtoes and counters in the shoe industry. U.S. Pat. Nos. 3,523,103; 3,590,411; 3,647,616; 3,891,785; 3,973,285; 4,814,037; 6,391,380; 6,475,619 and 4,795,404 disclose methods and materials for improving the stiffness and adhesive qualities of materials for use in the footwear industry (all of which are incorporated by referenced). The stiffening plastic resins are selected from styrene butadiene, polystyrene, polyvinylacetate, acrylic as well as other polymer lattices that may be saturated into a needle punch nonwoven fabric. Some of these types of stiffeners have hot melt adhesives coated onto their surfaces and are heat activated to bond to the shoe upper and lining. Some are activated with solvents and do not have heat activated hot melt adhesives. A second group of stiffeners are premolded materials made from polyvinylchloride, ionomers or thermoplastic rubbers (TPR). These premolded stiffeners require an adhesive to be painted on the surface for bonding to the shoe components. There are stiffeners that are made via extrusion of a resin such as an ionomer or other thermoplastic polymers and then require an extrusion coating of an adhesive onto the polymer sheet. The last category comprises stiffeners that are made from powders that are admixtures of a filler or hard material with an adhesive or softer material. These polymer powder blends are then heat sintered to produce a stiffener.

The ideal characteristic of the stiffener is to have high resiliency and good stiffness for a given weight of material. The saturated stiffeners can be made stiff but usually the stiffer grades do not have high resiliency. The saturated stiffeners, the premolded stiffeners and the extruded stiffeners all require an extra processing step to have an adhesive applied to the surface. The powder coated stiffeners usually involve a need for cryogrinding to be able to create a fine powder from a low melting point adhesive which results in added costs as well as a need for a critical particle size distribution. The powder coated materials, since they are sintered, are also less tough or strong and need extra weight for a given level of stiffness since the sintering action does not form a true melt of the material to maximize the physical properties. These materials also need high levels of the adhesive component in order to get good bonding to the various substrates that they will be attached to. This adds additional cost and additional weight. When hot melting the saturated materials or the extruded materials they need a significant amount of hot melt adhesive to be coated onto their surfaces in a separate step.

There are processes and products that are used in the packaging industry where a tie layer of adhesive is added to another resin to produce a very thin layer to bond these various layers together. Usually this is done with adhesive tie layers in which the adhesive component is similar in melt viscosity and melting point to the other layers. The process to produce these materials is an extrusion process that uses multiple extruders and either a multicomponent die block or a manifold die.

An object of the invention is to provide a material for use as a boxtoe or heel counter that has a maximum amount of stiffness with the least weight of the material.

SUMMARY

A first embodiment relates to a boxtoe material or a counter material for use in shoes that is stiff but light in weight. The high stiffness and low weight is achieved by making the stiffener with a foamed core material that is made by introducing a gaseous material into the core of the stiffener to reduce the weight without reducing the stiffness of the material.

DETAILED DESCRIPTION

An embodiment of the invention is a sheet material that can be three layers thick with two outer layers being an adhesive and a core layer providing the majority of the stiffening effect. This can be called an A/B/A type of sheet material with the B layer or core material being the stiffest.

An embodiment of the sheet material is made using two extruders with one extruder producing the outer two layers (i.e. the A layers of the A/B/A sheet material) and the second extruder producing the core layer (i.e. the B layer of the A/B/A sheet material), with a three layer manifold die being used for this embodiment. The outer layer of one embodiment is a thermoplastic polyurethane, such as BASF AH 652, which has a melting point of 70-80 C and a melt flow index of 10+/−3. The core layer has 86% Eastman GN071 PETG CoPolyester (specific gravity 1.27, deflection temperature of 70 C) and 14% Exxon Exact 9071 Thermoplastic polyolefin elastomer (density 0.870, melt flow rate 0.5 g/10 min and Tg −54F).

The extruded material that comes out of the die may be calendered into a sheet material. The sheet material can be of various thicknesses and weight in accordance with the particular end use. The sheet material typically is sampled and tested for stiffness using the Satra TM 83 test procedure.

An alternate embodiment of the above-described formulation for the core material can be a core formulation that makes use of the stiffener material recycled and ground and then put back into the core. The core also could be recycled PETG. This sheet material of this alternate embodiment may have the same outer layers as the first embodiment, but the core would be 51% GN071, 35% recycle, 14% Exact.

With either of these embodiments, a novel and surprisingly beneficial aspect of the invention involves introducing liquid Nitrogen into the last zone of the extruder barrel. The liquid Nitrogen mixes with the molten plastic resin and when the molten material exits the extruder/die, it would have formed a gaseous material and a closed cell foam in the core. This aspect of the disclosure provides a lower density product of less weight but still similar stiffness, as will be illustrated below in the examples. Teaching that is relevant to introducing nitrogen in an extruded polymeric material and controlling the nitrogen is disclosed in U.S. Pat. No. 6,616,434, the disclosure of which is incorporated herein by reference. In this regard, the nitrogen that is being introduced into the extruder may be controlled to be in a supercritical fluid state, as explained at column 5, lines 25-35 of U.S. Pat. No. 6,616,434, the disclosure of which has been incorporated herein.

Example 1. This example compares running the above formula without recycle in the core with and without gas. The core extruder contained the 86% PETG and 14% TPE and the outer layer extruder contained the TPU. The core ran at 185 pounds/hr and the outer layer at 85 pounds per hour. Samples were extruded into the die into the calendar rolls to cool and set thickness. One set of samples was run without any gas and the second set was run with 0.028% nitrogen gas into the core material. The following shows the Satra test method testing results on the non-gas control sample and on the sample that contained the Nitrogen added to the melt in the extruder.

|  | Sample Type | | | |
| --- | --- | --- | --- | --- |
|  | No Gas | Gas | No Gas | Gas |
| Thickness, mm | 0.89 | 0.90 | 1.29 | 1.33 |
| Weight, g/m2 | 947 | 758 | 1399 | 1038 |
| $1^{st}$ Collapse, KG | 7.0 | 5.5 | 16.0 | 10.5 |
| $10^{th}$ Collapse. Kg | 6.8 | 4.1 | 15.6 | 7.1 |
| Shape Retention, % | 98 | 98 | 98 | 97 |
| Resiliency, % | 97 | 75 | 97 | 68 |

If one compares the gas sample of 1038 g/m2 to the non-gas sample of 947 one has an increase of stiffness to 10.5 vs. 7.0 which is a 50% increase but only a weight increase of 9.6% or to achieve a value of 7 that sample would only have to weigh 692 g/m2 or a reduction of 27%. As noted above, the gas is nitrogen, which was injected as liquid nitrogen (more particularly supercritical fluid) in the extrusion of the core.

Example 2. This example was run with PET in place of PETG from New Era with an intrinsic viscosity of 0.825. The extruder temperature profile for zones 1-5 were 350F, 510F, 520F, 500F and 400F for zone 5 which had the liquid Nitrogen (or supercritical fluid nitrogen) injected into that zone. Formula ratios as above.

|  | Sample Type | | | |
| --- | --- | --- | --- | --- |
|  | Gas | Gas | Gas | No Gas |
| Thickness, mm | 1.06 | 1.06 | 1.16 | 0.91 |
| Weight, g/m2 | 1040 | 899 | 917 | 1077 |
| $1^{st}$ Collapse, KG | 14 | 12.1 | 14.0 | 14.5 |
| $10^{th}$ Collapse. Kg | 12 | 9.1 | 11.4 | 10.4 |
| Shape Retention, % | 97 | 92 | 99 | 99 |
| Resiliency ,% | 86 | 75 | 84 | 72 |

For this example, the weight for the 899 gas would have to be 1045 g/m2 to have the same first collapse which represents a 3% reduction in weight and a lower density. The gas sample above with a weight of 917 is 15% lower in weight than the no gas sample and has essentially the same $1^{st}$ collapse or stiffness as the no gas sample and is approximately 15% lower in weight by comparing the gas sample with the 917 weight to the no gas sample having the 1077 weight. The 1040 gas would also be around 3% lower in weight than the no gas sample with essentially the same $1^{st}$ collapse. However, the gas samples with the 917 weight have a higher $10^{th}$ collapse, which gives better resiliency and final stiffness.

Example 3. This example uses the above PETG formula that contains the recycle in the core material and as shown below shows a weight reduction of 14% based on achieving the same first collapse stiffness as the sample without the gas.

|  | Sample Type | |
| --- | --- | --- |
|  | No Gas | Gas |
| Thickness, mm | 1.04 | 1.04 |
| Weight, g/m2 | 1191 | 1026 |
| $1^{st}$ Collapse, KG | 11.4 | 11.2 |
| $10^{th}$ Collapse. Kg | 10.0 | 8.0 |
| Shape Retention, % | 98 | 96 |
| Resiliency, % | 82 | 71 |

Example 4. This example is based on a core material that is 86% PETG and 14% TPE but the outer 2 layers are PETG.

The extrusion rate of the core is 75 lbs./hr and the outer layer total extrusion rate is 30 lbs./hr.

|  | Sample Type | |
| --- | --- | --- |
|  | No Gas | Gas |
| Thickness, mm | 1.13 | 1.99 |
| Weight, g/m2 | 1355 | 1296 |
| $1^{st}$ Collapse, KG | 22 | 24.9 |
| $10^{th}$ Collapse. Kg | 21.9 | 22.7 |
| Shape Retention, % | 97 | 86 |
| Resiliency, % | 99.5 | 91.2 |

The foam shows a 5% reduction in weight at a higher $1^{st}$ collapse. If we were to adjust the collapse to the no foam value then the weight would drop to a 1145 for a reduction of 8%.

Based on the above testing one can use a PETG/TPE core or a PETG/TPE plus recycle core or a PET/TPE core formula and have the stiffness of the material be similar to that of a material that would be heavier in weight by using a 0.028% Nitrogen liquid injection into the extruder to create a gas foam in the product that will reduce the weight and not negatively impact the stiffness.

Example 5. This example is an ABA material with the A layers representing 14% of the total weight and the core of 86% that compares the control of the core consisting of 56% PETG,30% recycle,9% elastomer and 5% Polyurethane to the gas made sample of 70% PETG,30% recycle and 0.0217% gas and 0.014% MuTalc NB 27(MuCelli corporation nucleating agent) with the outer layers being the TPU material as described above. The outer layers ran at 83 pounds/hr. and the core ran at 516 pounds per hour.

|  | Sample Type | |
| --- | --- | --- |
|  | No gas | Gas |
| Thickness, mm | 0.97 | 0.99 |
| Weight, g/m2 | 1139 | 952 |
| $1^{st}$ Collapse, KG | 12.68 | 12.08 |
| $10^{th}$ Collapse. Kg | 9.24 | 8.04 |
| Shape Retention, % | 97 | 96 |
| Resiliency, % | 73 | 67 |

The weight reduction is 17%, but the stiffness as determined by the $1^{st}$ collapse is still similar to the control no gas sample and the resiliency is good even after taking out the elastomer and polyurethane as the gas helps to improve the resiliency as compared to a material that would be made with no elastomer and polyurethane and a greater level of PETG that would be stiffer and less resilient.

Example 6. This example represents using this foaming technology on a more flexible type of material in which one does not lose the flexibility or stiffness when comparing the control to the foamed sample. This too is an ABA material but has a core that is more flexible. The A layer is the same as above and is 23% of the total weight and the core material for the control consists of 25% PETG, 23% recycle, 26% AH-652 TPU and 26% recycle polyurethane. The gas made sample consists of 40% PETG, 11% TPU AH-652, 23% Recycle and 26% Recycle Polyurethane and 0.02% nitrogen and 0.014% MuTalc NB27. The extra PETG is to improve the stiffness since the weight is lower but the flexibility is helped by the gassing to overcome the extra PETG and less TPU

|  | Sample Type | |
| --- | --- | --- |
|  | No Gas | Gas |
| Thickness, mm | 0.54 | 0.53 |
| Weight, g/m2 | 634 | 539 |
| 1$^{st}$ Collapse, KG | 1.29 | 1.22 |
| 10$^{th}$ Collapse, Kg | 1.11 | 1.03 |
| Shape Retention, % | 98 | 98 |
| Resiliency, % | 86 | 84 |

The weight is 15% less and yet the stiffness and resiliency are very similar and taking out the TPU and adding extra PETG to increase the stiffness did not hurt as the gas made up for the elimination of some of the TPU and still gave very good resiliency/flexibility.

Example 7. This example represents an A/B/A structure with the A layers being 98% low temperature TPU and 2% antiblock, and the B core layer being 45% Recycle (65.9% PETG,14.9% TPE elastomer,18.9% TPU,0.4%antiblock), 30% TPE Elastomer, 25% Recycle Polyurethane.

The A layer is 183 g/m2 and the B layer is 629 g/m2.

The foam material is the same A layer and the core layer which is foamed is 55% Recycle (65.9% PETG,14.9% TPE elastomer,18,9% TPU, 0.4% antiblock), 30% TPE elastomer, 15% recycle Polyurethane, 0.015%-0.025% nitrogen gas and 0.15%-0.25% nucleating agent. The A layer weighs 187 g/m2 and the B layer weighs 505 g/m2. The following is the test results:

|  | Sample Type | |
| --- | --- | --- |
|  | No Gas | Gas |
| Thickness, mm | 0.75 | 0.76 |
| Weight, g/m2 | 812 | 693 |
| 1$^{st}$ Collapse, KG | 1.20 | 1.35 |
| 10$^{th}$ Collapse, KG | 0.95 | 1.20 |
| Resiliency, % | 79.5 | 88.9 |

These data indicate that the gas sample has a weight reduction of 15% but still has an equal or greater first collapse.

Example 8. This example is an A/B/A structure but on one side has a polyester spun lace fabric laminated to it that weighs 50 g/m2.

The A layers are 98% low melt TPU and 2% antiblock

The B layer is 45% Recycle (65.9% PETG,14.9% TPE Elastomer,18.9% Polyurethane,0.4% antiblock), 30% TPE, 25% Recycle Polyurethane.

The A layer is 187 g/m2 and the B layer is 643 g/m2.

The foam material is also an A/B/A structure with the A layer composition as indicated above. The B layer is 55% Recycle (65.9% PETG, 14.9% TPE Elastomer, 18.9% TPU, 0.4% antiblock), 30% TPE Elastomer, 15% Recycle Polyurethane, 0.015%-0.025% Nitrogen gas and 0.15-0.25% Nucleating agent.

The A layer is 187 g/m2 and the B layer 506 g/m2.

The following is the test results:

|  | Sample Type | |
| --- | --- | --- |
|  | No Gas | Gas |
| Thickness, mm | 0.92 | 0.92 |
| Weight, Kg | 880 | 743 |
| 1$^{st}$ collapse, kg | 1.80 | 1.64 |
| 10$^{th}$ collapse | 1.42 | 1.34 |
| % Resiliency | 79 | 82 |

The total weight reduction is 16.5% and the core weight reduction is 21.3% with similar dome values.

For examples 7 and 8, the TPU used in the A layers has a melting point of 50-60C and a Shore A hardness of 97 and a melt flow of 10+/−5 g/10 min at 150C The polyurethane has a melt point between 65-90 C with the same hardness and melt flow index.

Example 9. This example is based on using Polyethylene Vinyl Acetate, EVA polymers.

EVA #1 is 17.8% VA content, melt Index of 0.34 g/10 min and peak melting point of 88C.

EVA #2 is 27.5% VA content, melt index of 25 g/10 min and a peak melting point of 71 C.

The control no foam and the foam products both have an A/B/A structure with the same A structure of 34% EVA #1 and 64% EVA #2 and 2% antiblock.

The control product no foam has a core of 34% EVA #1 and 66% EVA #2.

The foam product has a core of 34% EVA #1, 66% EVA #2 and 0.015-0.025% Nitrogen gas and 0.15-0.25 Nucleating agent.

The following is the test data:

|  | Sample type | |
| --- | --- | --- |
|  | No Gas | Gas |
| Thickness, mm | 0.85 | 0.85 |
| Weight, g/m2 | 796 | 677 |
| 1$^{st}$ collapse, Kg | 0.35 | 0.35 |
| 10$^{th}$ Collapse, Kg | 0.27 | 0.27 |
| % Resiliency | 76.5 | 76.5 |
| Overalll Weight reduction, % | | 15% |
| Core Weight reduction, % | | 19.3% |

What is claimed is:

1. A microcellular foam box toe stiffener material or heel counter stiffener material, comprising:
 a stiffener core with opposite first and second surfaces,
 at least a first adhesive layer coextruded with the stiffener core and carried on at least the first surface of the stiffener core,
 the stiffener core having a thickness in a range of about 0.55 mm to about 1.40 mm, and comprising a polymeric material, a nucleating agent, and nitrogen gas,
 the polymeric material being selected from the group consisting of polyethylene terephthalate glycol (PETG), PETG co-polyester, polyethylene terephthalate (PET), polyurethane (PU), polyethylene vinyl acetate (EVA), recycled PETG, recycled PET, recycled PU, recycled EVA, thermoplastic polyolefin elastomers (TPE), and combinations thereof, the nucleating agent comprises 0.014% to 0.25% by weight based on 100% by weight of the polymeric material, the nitrogen comprises from about 0.016% to about 0.0228% by weight based on 100% by weight of the polymeric material, wherein the stiffener core achieves a weight reduction of up to 30% compared to an identical stiffener core without the nitrogen gas, and wherein the stiffener core meets or exceeds $1^{st}$ collapse and $10^{th}$ collapse product specifications using SATRA TM83 test method.

2. The microcellular foam box toe stiffener material or heel counter stiffener material of claim 1, further comprising a second adhesive layer coextruded with the stiffener core and carried on the second surface of the stiffener core.

3. The microcellular foam box toe stiffener material or heel counter stiffener material of claim 2, wherein the first and second adhesive layers are low melting point polyurethane adhesive.

4. The microcellular foam box toe stiffener material or heel counter stiffener material of claim 3, wherein the first and second adhesive layers together are about 14% to about 23% by weight of the stiffener material, and wherein the stiffener core is about 77% to about 86% by weight of the stiffener material.

5. The microcellular foam shoe stiffener material or heel counter stiffener material of claim 2, wherein the stiffener core comprises is about 86% by weight of the PETG co-polyester and about 14% by weight of the thermoplastic polyolefin elastomer.

6. The microcellular foam box toe stiffener material or heel counter stiffener material of claim 2, wherein the stiffener core comprises up to 100% recycled polymeric material by weight selected from the recycled PETG, the recycled PET, the recycled PU and the recycled EVA.

7. The microcellular foam shoe stiffener material or heel counter stiffener material of claim 2, wherein the stiffener core comprises, by weight, from about 40% to about 70% of the PETG, from about 0% to about 11% of a low melt temperature polyurethane, from about 23% to about 70% of the recycled polyurethane, and about 26% of a high melt temperature polyurethane.

8. The microcellular foam box toe stiffener material or heel counter stiffener material of claim 2, wherein the stiffener core further comprises, by weight, from at least about 86% of the PET, and from about 0% to about 14% of the thermoplastic polyolefin elastomer.

9. The microcellular foam box toe stiffener material or heel counter stiffener material of claim 2, wherein the first and second adhesive layers together are about 14% to about 23% by weight of the stiffener material and the stiffener core is about 77% to about 86% by weight of the stiffener material.

10. The microcellular foam box toe stiffener material or heel counter stiffener material of claim 1, wherein the first adhesive layer comprises a low melting point polyurethane adhesive.

11. The microcellular foam box toe stiffener material or heel counter stiffener material of claim 1, wherein the stiffener core comprises from about 0.15% to about 0.25% by weight of the nucleating agent based on 100% by weight of the polymeric material.

12. The microcellular foam box toe stiffener material or heel counter stiffener material of claim 1, wherein the stiffener core comprises up to 100% recycled polymeric material by weight selected from the recycled PETG, the recycled PET, the recycled PU and the recycled EVA.

13. A microcellular foam box toe stiffener material or heel counter stiffener material, comprising:

a stiffener core having opposite first and second surfaces, and first and second adhesive layers coextruded with the stiffener core and carried respectively on the first and second surfaces of the stiffener core, the stiffener core having a thickness in a range of about 0.55 mm to about 1.40 mm, and comprising a recycled polymeric material, a thermoplastic elastomer, a nucleating agent, and nitrogen gas, wherein the recycled polymeric material comprises polyethylene terephthalate (PET), wherein the nitrogen gas comprises from about 0.016% to about 0.0228% by weight based on 100% by weight of the recycled polymeric material and the thermoplastic elastomer, wherein the nucleating agent comprises 0.014% to 0.25% by weight based on 100% by weight of the recycled polymeric material and the thermoplastic elastomer, wherein the stiffener core achieves a weight reduction of up to 30% compared to an identical stiffener core without nitrogen gas, and wherein the stiffener core meets or exceeds $1^{st}$ collapse and $10^{th}$ collapse product specifications using SATRA TM83 test method.

14. The microcellular foam box toe stiffener material or heel counter stiffener material of claim 13, wherein the thermoplastic elastomer comprises from about 0% to about 14% by weight based on the total weight of the stiffener core.

* * * * *